US012085473B2

(12) United States Patent
Kim et al.

(10) Patent No.: US 12,085,473 B2
(45) Date of Patent: Sep. 10, 2024

(54) DEFLECTOMETRY DEVICES, SYSTEMS AND METHODS

(71) Applicant: Arizona Board of Regents on Behalf of the University of Arizona, Tucson, AZ (US)

(72) Inventors: Dae Wook Kim, Tucson, AZ (US); Logan Rodriguez Graves, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 372 days.

(21) Appl. No.: 17/430,635

(22) PCT Filed: Feb. 24, 2020

(86) PCT No.: PCT/US2020/019451
§ 371 (c)(1),
(2) Date: Aug. 12, 2021

(87) PCT Pub. No.: WO2020/176394
PCT Pub. Date: Sep. 3, 2020

(65) Prior Publication Data
US 2022/0146370 A1    May 12, 2022

Related U.S. Application Data

(60) Provisional application No. 62/809,896, filed on Feb. 25, 2019.

(51) Int. Cl.
*G01M 11/02* (2006.01)
*G01N 21/88* (2006.01)
(52) U.S. Cl.
CPC ....... *G01M 11/025* (2013.01); *G01N 21/8806* (2013.01); *G01N 2021/8829* (2013.01)

(58) Field of Classification Search
CPC ............ G01M 11/025; G01N 21/8806; G01N 2021/8829
See application file for complete search history.

(56) References Cited

U.S. PATENT DOCUMENTS 4,794,550 A     12/1988  Greivenkamp, Jr.
6,043,885 A  *   3/2000  Mazuet .............. G01M 11/0242
                                                   356/127

(Continued)

FOREIGN PATENT DOCUMENTS

WO       2017177180 A1    10/2017
WO       2018094277 A1     5/2018

OTHER PUBLICATIONS

Graves, Logan R, et al., "Infinite deflectometry enabling 2π-steradian measurement range," College of Optical Sciences, University of Arizona, 26 pages.

(Continued)

*Primary Examiner* — Hung V Nguyen
(74) *Attorney, Agent, or Firm* — Perkins Coie LLP

(57) ABSTRACT

Devices, methods and systems are disclosed that enable deflectometry on a wide array of objects, including convex and freeform optical components. One example deflectometry system includes a light source with a plurality of light emitting devices to illuminate an object under test with incident light, and a detector positioned to receive a reflected or transmitted light from the object under test. The deflectometry system further includes a movable stage for holding or securing the object under test. The movable stage can move in a translational or a rotational direction to cause the object under test to translate or rotate in a plurality of steps such that the light received at the detector encompasses a portion of a full illumination space surrounding the object, and the light received at the detector from all of the plurality (Continued)

of steps encompasses the full illumination space that contiguously surrounds the object under test.

16 Claims, 11 Drawing Sheets

(56) References Cited

U.S. PATENT DOCUMENTS

| | | | |
|---|---|---|---|
| 10,598,604 B1 * | 3/2020 | Schiltz | G01N 21/8806 |
| 10,782,242 B2 * | 9/2020 | Muhr | G06T 7/001 |
| 11,310,467 B2 * | 4/2022 | Allen | H04N 7/188 |
| 11,328,380 B2 * | 5/2022 | Pinter | G06T 7/586 |
| 2005/0238237 A1 | 10/2005 | Haeusler et al. | |
| 2015/0192769 A1 | 7/2015 | Dresel et al. | |
| 2018/0058977 A1 | 3/2018 | Trumm et al. | |

OTHER PUBLICATIONS

International Search Report and Written Opinion mailed Jun. 22, 2020 for International Patent Application No. PCT/US2020/019451 (8 pages).

* cited by examiner

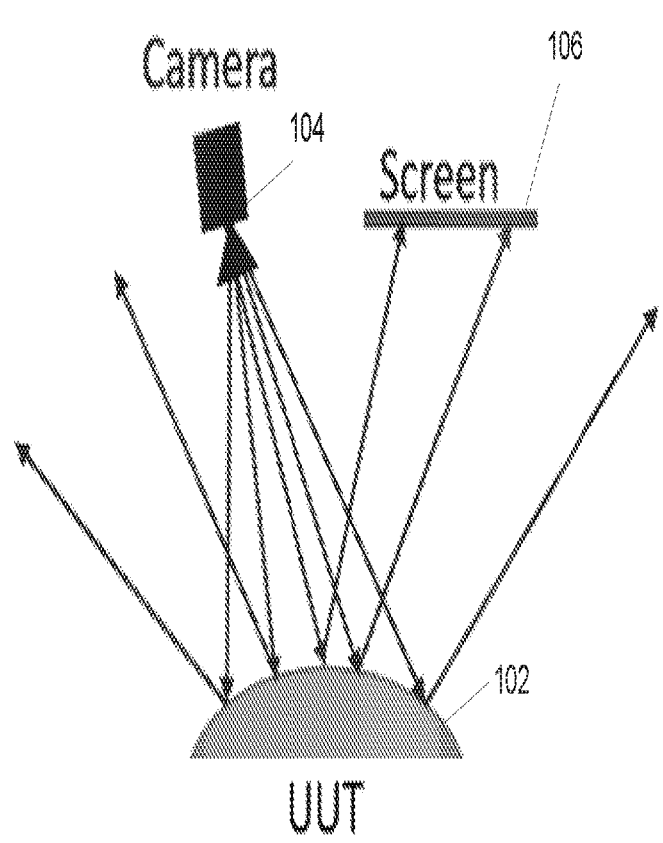
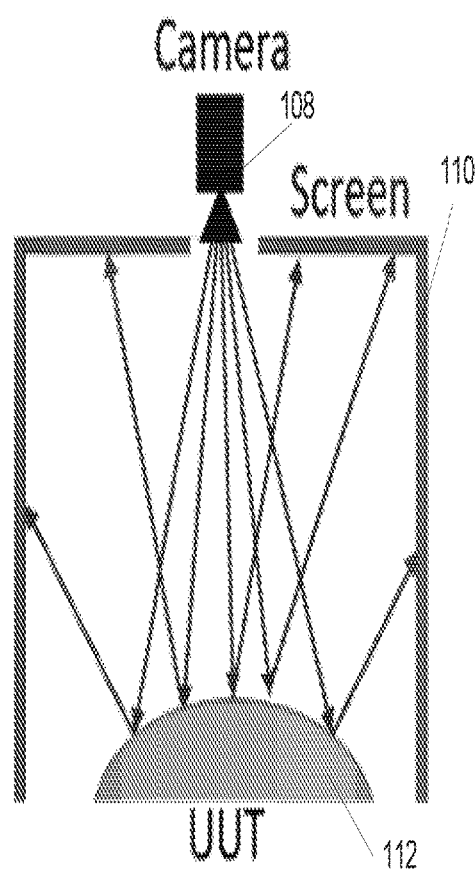
FIG. 1(a)
FIG. 1(b)

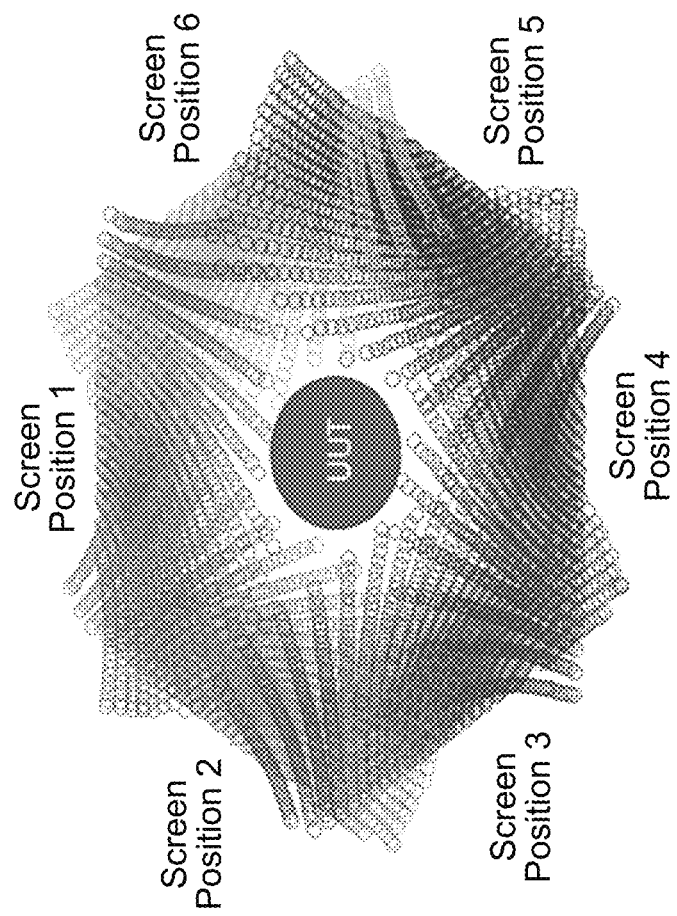
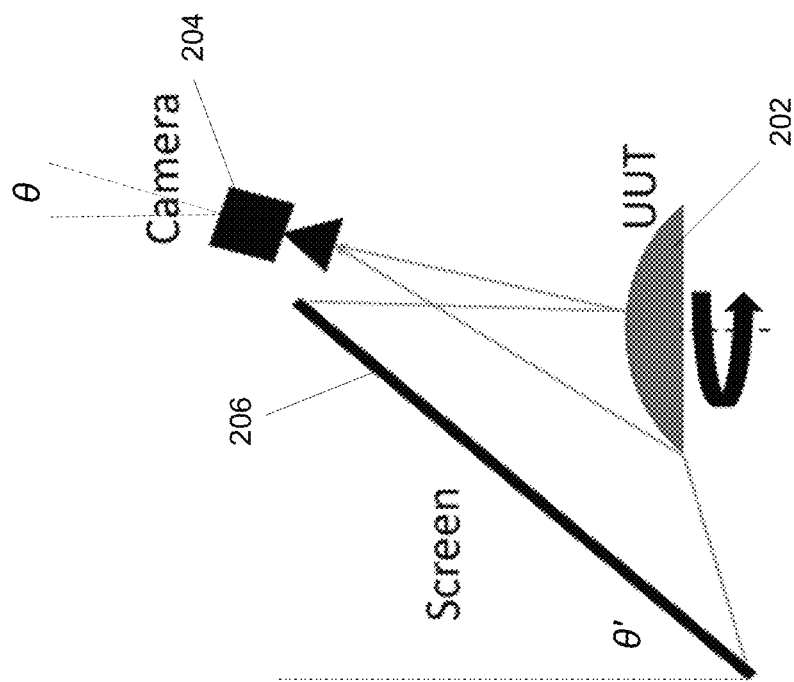
FIG. 2(b)
FIG. 2(a)

Interferometry
F/0.75 Ref Sphere

Infinite
Deflectometry

|  | Surface RMS Zernike Terms 1:4 Removed (nm) | Surface RMS Zernike Terms 1:6 Removed (nm) | Surface RMS Zernike Terms 1:21 Removed (nm) | Surface RMS Zernike Terms 1:37 Removed (nm) |
|---|---|---|---|---|
| INT | 462.04 | 447.69 | 53.71 | 18.48 |
| $ID_{100}$ | 477.34 | 431.49 | 56.00 | 16.26 |

FIG. 7

DEFLECTOMETRY DEVICES, SYSTEMS AND METHODS

CROSS REFERENCE TO RELATED APPLICATIONS

This patent document is a 371 National Phase Application of International Patent Application No. PCT/US2020/019451, filed Feb. 24, 2020, which claims priority to the provisional application with Ser. No. 62/809,896, titled "DEFLECTOMETRY DEVICES, SYSTEMS AND METHODS," filed Feb. 25, 2019. The entire contents of the above noted applications are incorporated by reference as part of the disclosure of this document.

TECHNICAL FIELD

The disclosed embodiments relate generally to metrology, and in particular to deflectometry devices and techniques.

BACKGROUND

Optical techniques for determining an object's physical characteristics, such as dimensions, surface profiles, depth measurements and the like have proliferated with some degree of success. While the non-contact nature of optical testing and measurement using, for example, interferometry offers high accuracy and precision in surface metrology, such techniques require a null setup to obtain accurate test results of an object or unit under test (UUT). Alternatively, deflectometry is a non-null test method which has been shown to provide surface metrology accuracy similar to commercial interferometry systems. Deflectometry relies on rays from a source that are directed toward a UUT; the deflected rays are captured by a capture device, such as a camera, and analyzed to determine the surface characteristics of the UUT. The analysis in phase-shifting deflectometry techniques typically includes determining local slopes across the UUT based on the detected light, which can be used to reconstruct the surface through integration.

While existing interferometric and deflectometry techniques may be feasibly implemented for measuring concave and/or small objects, they become prohibitively expensive and even impossible for convex optics, both standard in shape, as well as freeform.

SUMMARY

The disclosed embodiments provide simple and compact, yet accurate, deflectometry devices, methods and systems for measuring optical components having arbitrary shapes and surface characteristics, including flat and/or convex optical components. The disclosed embodiments enable full aperture surface reconstruction sag maps of freeform surfaces to be produced for optical components that were previously challenging to measure. The disclosed techniques, among other features and benefits, rely on the creation of a virtual source enclosure around a test optic which creates a virtual $2\pi$-steradian measurement range, which can be extended to the full $4\pi$-steradian measurement range as disclosed herein.

One aspect of the disclosed embodiments relates to a deflectometry system that includes a light source having a plurality of light emitting devices that are arranged in a sequence to illuminate an object under test with incident light, and a detector positioned to receive a reflected light produced upon reflection of the incident light from the object under test or a transmitted light produced upon transmission of the incident light through the object under test. The deflectometry system further includes a movable stage for holding or securing the object under test. The movable stage is configured to move in one or both of a translational or a rotational direction and to thereby cause the object under test to translate or rotate. The movable stage is also configured to move in a plurality of steps such that, for each of the plurality of steps, the reflected light or the transmitted light received at the detector encompasses a portion of a full illumination space surrounding the object under test, and the reflected light or the transmitted light received at the detector from all of the plurality of steps encompasses the full illumination space that contiguously surrounds the object under test.

BRIEF DESCRIPTION OF THE DRAWINGS

FIG. 1(a) is an example diagram illustrating a shortcoming of the existing deflectometry systems.

FIG. 1(b) illustrates an alternative deflectometry configuration in which a source screen encloses a unit under test.

FIG. 2(a) illustrates a deflectometry system for measuring characteristics of a unit under test in accordance with some example embodiments.

FIG. 2(b) illustrates a reverse ray trace from a camera to the unit under test for the example deflectometry system of FIG. 2(a).

FIG. 7 illustrates surface sag RMS values of the reconstructed surface maps obtained using a commercially available interferometer and using a deflectometry system in accordance with an example embodiment.

DETAILED DESCRIPTION

Figure 3:
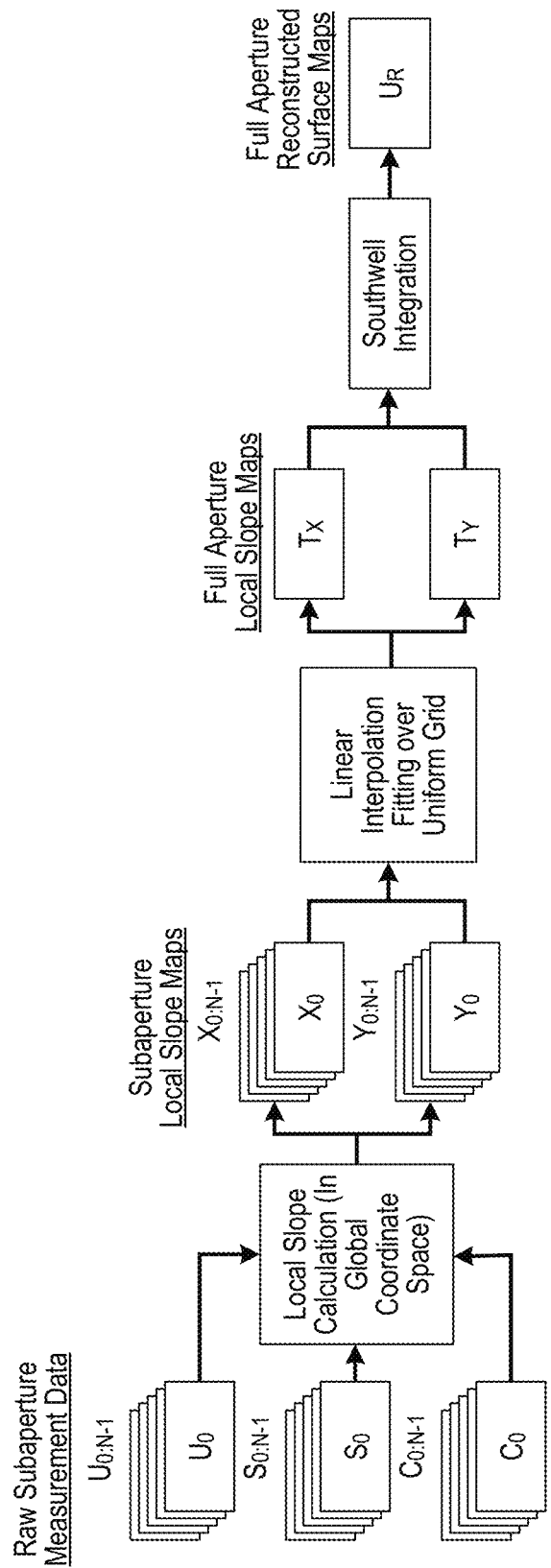
FIG. 3 illustrates a set of operations to produce a full aperture reconstructed surface map for a unit under test in accordance with an example embodiment.

Freeform optics provide ever-growing possibilities in designing cutting edge optical systems, but their fabrication and metrology remain challenging, which is further exacerbated by a lack of relatively inexpensive, yet accurate non-contact optical measurement techniques to conduct surface and profile measurements. In this regard, interferometric approaches, swing arm profilometry, and the Hindle test, for example, typically require measuring sub-apertures of the unit, which are then 'stitched' together. However, as noted earlier, having an interferometric setup and the required null optic is not always a viable option.

Existing deflectometry techniques similarly fail to provide an economically feasible solution and may not be capable of measuring convex or freeform optical components. For example, using an array of projectors may operate as a source enclosure around a UUT, but projector systems suffer from lower resolution, optical aberrations, contrast uniformity, and more. In addition, current deflectometry techniques cannot be used with objects having certain geometric characteristics. FIG. 1(a) is a simple example illustrating a shortcoming of the existing deflectometry methods. As illustrated in FIG. 1(a), a screen 106 (i.e., a light source having a plurality of individual light sources) is used to illuminate the UUT 102; the light rays upon deflection from the surface are captured by a camera 104. If considered in reverse, rays can be traced from the camera 104 to the UUT 102 where they are deflected by the UUT mirror surface and, if they pass through the source area, the local slope on the UUT 102 can be determined using geometry. As illustrated, only a small fraction of the light rays that are incident upon a relatively small area of the UUT 102 are captured by the camera 104, whereas the majority of the deflected rays are outside the field of view of the camera 104, and are thus not captured. Thus, for some surfaces, such as a convex optic, a regular screen is not large enough to allow for testing the full area of the UUT due to the missing rays. It should be noted that the diagram in FIG. 1(a) is only provided for illustration purposes, and similar problems exist for flat UUTs, and concave UUTs that have a large radius of curvature, as well as freeform optics which may have an irregular shape.

FIG. 1(b) illustrates an alternative deflectometry configuration in which a source screen 110 encloses the UUT 112, thus allowing for testing the full range of surface slopes without the camera 108 missing any rays. However, a monolithic box-shaped screen 110 which encloses the UUT 112 as shown in FIG. 1(b) does not exists or cannot be feasibly implemented in practice. Utilizing a projector system is one alternative but, as noted earlier, there are significant distortion, uniformity, and mapping challenges associated with projectors, which limit their usability for high precision nanometer scale optical tests.

The disclosed embodiments, among other features and benefits, address the above shortcomings of existing deflectometry systems and provide simple and compact, yet accurate, deflectometry devices, methods and systems that can be feasibly implemented for measuring optical components having arbitrary shapes and surface characteristics, including flat and/or convex optical components. The disclosed techniques, in some embodiments enable a $2\pi$-steradian measurement range (i.e., a half-sphere). In some embodiments, the disclosed techniques enable a $4\pi$-steradian measurement range. In this document, the disclosed deflectometry systems and methods are sometimes referred to as infinite deflectometry (ID) because they enable an 'infinite' dynamic range (practically limited by camera line of site).

A modern LCD is a common source used in a deflectometry setup, desirable for its high resolution and stability. Depending on the system architecture and the optic under test, there is a limit to the testable dynamic range of surface slopes for the UUT for given display size and resolution. The testable dynamic range increases as the size of the display increases, but there is a limit to the size of display that can reasonably be obtained. In this way, the benefit of a small high-resolution display can be leveraged while at the same time creating a larger source area. According to some embodiments, instead of increasing the size of the screen, a series of virtual screens are generated. In this way, the benefit of a small high-resolution display can be leveraged while at the same time creating a larger source area.

FIG. 2(a) illustrates a deflectometry system for measuring characteristics of a unit under test in accordance with some example embodiments. In this example configuration, a planar light source 206 (e.g., a display device having a plurality of light sources arranged in a sequence, such as a row-column pixel format) is positioned with a tilted angle, θ', over the UUT 202, with a camera 204 positioned at tilted angle θ, over the UUT 202 to image the surface. In this configuration, to generate a virtual screen (or a virtual light source that provides a continuous light enclosure for the UUT 202), the UUT 202 is clocked or rotated by a fixed angular step, which presents new areas of the UUT 202 to the screen 206 and camera 204. After a full $2\pi$ rotation of clocking steps, this can equivalently be thought of as generating a tipi-shaped virtual screen. Because each screen can only cover a segment of the UUT 202, a reverse ray trace from the camera 204 pinhole to the UUT 202 is performed to determine the intercept locations with the virtual screens, which is illustrated from the top down as scattered points in FIG. 2(b). In FIG. 2(b), data for six screen positions is illustrated. This process is repeated to create overlapping virtual screens which entirely enclose the optical component, thus allowing for the entire range of surface slopes to be measured. The process described with the aid of FIG. 2(a) can be thought of as virtually clocking the screen and camera to create a virtual source enclosure allowing for the same precision metrology over the full UUT aperture. Accordingly, one high-performance screen which can test only a limited area on the UUT can be turned into plural screens to enclose the UUT.

To facilitate the processing of the information obtained using the configuration of FIG. 2(a), it is instructive to first describe the operations in phase shifting deflectometry that calculates the local slopes on a UUT using a camera and a digital display. A camera is positioned to image the UUT surface. The camera pixels have their 3D location recorded, defined as $x_c$, $y_c$, $z_c$, and the pixels are mapped to the UUT surface. The mapped pixels represent discrete areas on the UUT where the local slopes will be calculated, known as 'mirror pixels'. The 3D location of the UUT and specifically the precise location of the mirror pixels is determined for the test, defined as $x_U$, $y_U$, $z_U$. The digital source displays a sinusoid pattern in the x- and y-directions, using a minimum of 3 phase steps. The reflected light is captured by the camera and the recorded wrapped phase is acquired. The phase is unwrapped and the precise location on the source which successfully illuminated every camera pixel corresponding to its mirror pixel is determined. By relating these to the location of the display, the 3D location of the display points corresponding to the camera detector pixels is determined, referred to as $x_S$, $y_S$, $z_S$. Using these three data matrices, the local slopes in the x- and y-orthogonal directions of the UUT at the discrete 'mirror pixels' are calculated. Finally, the local slopes are integrated, typically using a zonal integration method such as a Southwell integration. In this way, the surface is reconstructed from a deflectometry slope measurement.

FIG. 3 is a flow diagram illustrating the data processing flow from raw data acquisition to a full aperture reconstructed surface map in accordance with an example embodiment. The example process flow can be applied to the data that is obtained based on the configuration of FIG. 2(a). At each clocking position, a deflectometry measurement is performed which covers a partial section of the UUT. After recording the data, the local slopes are calculated for every virtual configuration. This is done by determining the 3D positions of the camera, screen, and UUT in the default unclocked test position. These, for example, can be described as matrices which contain the individual local x, y, z positions and can be referred to as $C_0$, $S_0$, and $U_M$, respectively. It should be noted that $U_M$ represents an accurate model of the UUT whose center position defines the global coordinate system.

During processing, for the first clocked testing position, the camera and base screen position matrices are rotated about the UUT optical axis by the amount the UUT was clocked during the test, creating new 3D position matrices. The new virtual camera position matrix is referred to as Ci and following the phase unwrapping process the local screen positions are correlated to the global screen position, and the new virtual screen position matrix, $S_1$, is determined. This process is repeated for every clocking position, which for N clocking positions of the UUT results in a total of N (0 to N−1) camera and source 3D position matrices. When this process is completed, N deflectometry test data sets exist, and the local slopes for every test set are determined. This is accomplished by tracing the camera pixels for every camera matrix $C_{0:N-1}$ to $U_M$, the UUT model, to determine the local ray intercept locations. These local ray intercept points, which are the $x_U$, $y_U$, $z_U$ coordinates for every clocking position, are stored in matrices $U_{0:N-1}$. Knowing the final ray locations, which are recorded as the $x_S$, $y_S$, $z_S$ in screen matrices $S_{0:N-1}$, the local slopes on the UUT model for every virtual test system in the global x- and y-directions are determined and recorded as $X_{0:N-1}$ and $Y_{0:N-1}$, respectively.

To combine the data into cohesive x- and y-local slope maps of the UUT, a multi-step process can be used. First, due to uncertainty in positioning of components, there exist some uncertainties associated with the positions determined for all components in the system. These errors most heavily dominate low spatial frequency shapes, particularly piston, tip and tilt, defocus, and astigmatism. Therefore, these terms can be removed from the local slope maps by subtracting the mean values of the local slopes and then performing a best fit plane to the data and subtracting this away as well. In the spatial domain, the mean of the local slopes represents the tip/tilt (depending on if it is the x- or y-data) while the plane fit to the data represents the first derivate of the surface, corresponding to the defocus and astigmatism of the surface. It is worth noting that, this uncertainty can be reduced with more thorough calibration and higher accuracy hardware components, which broadly is true for all general stitching metrology system cases.

After this step, the data can be combined by, for example, performing linear interpolation fitting which takes the x and y UUT intercept locations and the adjusted local slope data for every test and generates a single cohesive x and y slope map of the UUT. The x and y slope maps are generated over a uniform grid. The local slopes can be averaged for positions where the ray intercepts overlap for two or more sub-aperture local slope measurements. The local slope maps in the x and y directions of the entire UUT surface can be referred to as $T_X$ and $T_Y$ respectively. It must be noted that because the subaperture local slope maps have their slopes determined in the global coordinate system, all subaperture local slope maps are in the same reference frame. A reconstructed surface sag map, referred to as $U_R$, can be generated by performing, for example, a Southwell integration operation on $T_X$ and $T_Y$. FIG. 3 demonstrates the data processing flow from raw data acquisition to a full aperture reconstructed surface map.

It is important to note that one of the advantageous features of the disclosed embodiments is in the enhanced dynamic range enabled by the virtual tipi screen geometry, which can be augmented with various generalized or specially tailored stitching algorithms. The disclosed methods and devices were used to test previously unmeasurable surfaces using traditional deflectometry, which demonstrate that the disclosed technology can greatly extend the dynamic range of deflectometry to provide full aperture surface reconstruction of freeform surfaces, including flat or convex optics.

Figure 4B:
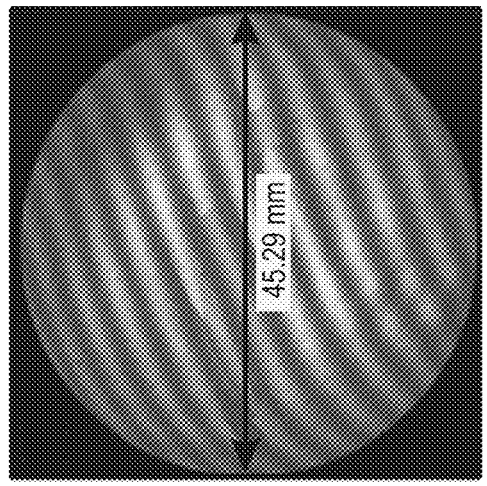
FIG. 4(b) illustrates an optical component being measured using a commercially available interferometer.
Figure 4C:
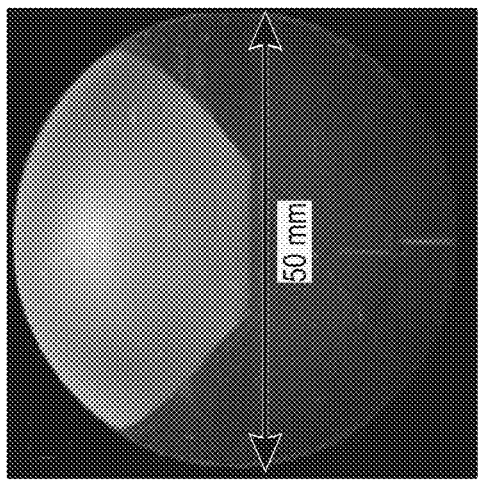
FIG. 4(c) illustrates the optical component of FIG. 4(b) that is measured using the benchtop deflectometry system of FIG. 4(a) in accordance with an example embodiment.
Figure 4A:
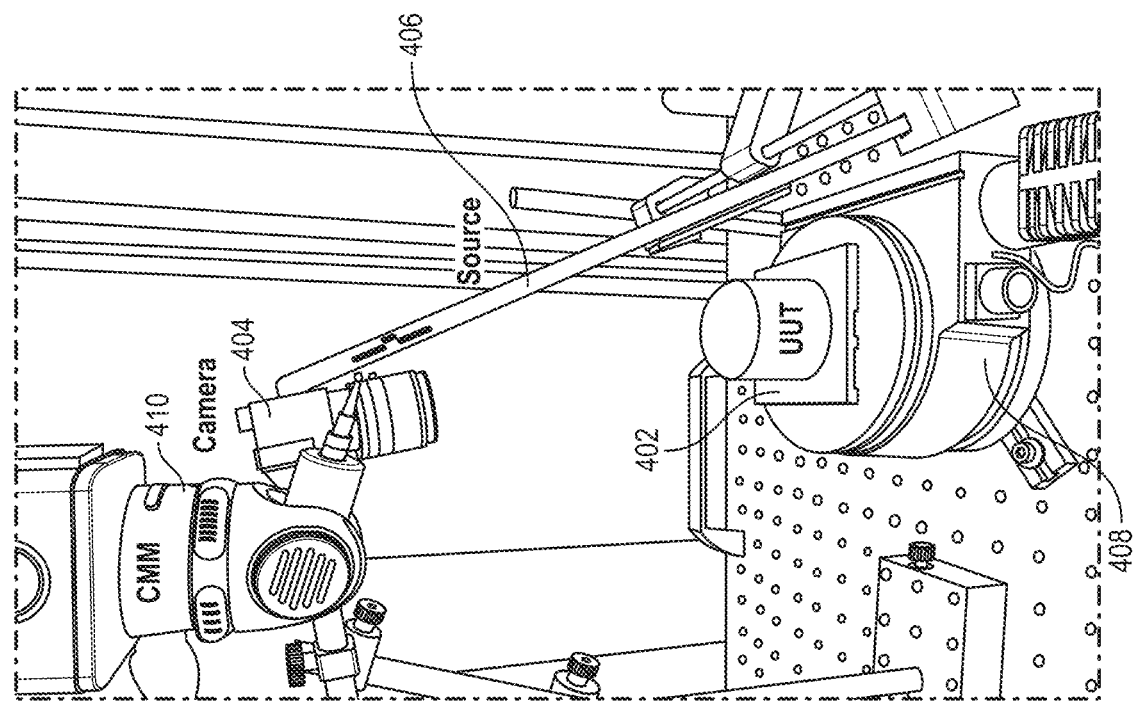
FIG. 4(a) illustrates an example benchtop deflectometry configuration in accordance with an example embodiment.

Example System Hardware: To build and demonstrate an example of the disclosed Infinite Deflectometry system, a camera, source, and a precision rotation stage were acquired. FIG. 4(a) illustrates the example system. The system included a Point Grey Flea3 camera 404 (Model #FL3-U3-32S2M-CS), which has a 2.5 μm pixel pitch. This camera 404 was utilized as its technical and mechanical data is well specified, and it has a high-resolution detector. For the source 406, an Apple iPad Pro (Model #A1670) was utilized which measured 262.85×197.04 mm and had 2732×2048 pixels, with a 96.2 μm pixel pitch. The UUT 402 was placed on a custom 3D printed mount, which fit into the rotation stage utilized for the test (collectively 408) and centered the optic to the center of the rotation stage. The rotation stage 408 included a Klinger motorized rotary stage (Model #DPI79), driven by a Leadshine digital stepper driver (Model #EM402).

The camera 404 was mounted nearly centered above the UUT 402, while the screen 406 was mounted in front of the UUT 402, and was tilted, such that the top edge of the screen 406 slightly passed over the center of the UUT 402. All components were mounted on a breadboard to maintain their position throughout testing. The edges of the camera 404 body and the screen 406 body were measured using a Coordinate Measuring Machine (CMM) 410, accurate to ±10 μm. Using technical drawings, the pixel positions were located relative to the camera 404 body, while a plane was fit to the screen 406. The UUT 402 body and center was measured as well, and the center of the UUT 402 served as the global origin (0, 0, 0) coordinate. The z-axis was defined as normal to the UUT 402 and pointing up, away from the breadboard. The y-axis was defined as pointing toward the screen 406 from the UUT 402 center, and the x-axis was orthogonal to the z- and y-axis The camera pointing vectors was determined previously using a process that relies on mounting the camera system such that it is pointed at a high precision monitor. The 3D position of the monitor 406 and the camera 404 are measured using a CMM 410. A line scan is performed on the monitor 406 while the camera 404 records. For every pixel on the camera 404, the centroid of the measurement response is determined to precisely calculate which location on the screen 406 was being measured by every camera pixel. The monitor 406 was then translated along the optical axis of the camera 404 and the process was repeated. In doing so, the precise ray vector for every camera 404 pixel between the two screen positions were calculated, which served as calibration of the camera ray pointing vectors. This process was performed for the camera 404 used prior to it being mounted in the system.

Once the overall assembly and the camera calibration was performed, the system was used for metrology. For every clocking position, a 16-step phase shifting deflectometry (PSD) test was performed. This involved using 8 phase steps in the horizontal and vertical directions (defined by the screen) each. The entire system was shielded during all tests from stray background light by placing a heavy black cloth over the system. After a measurement was performed, the data for the clocking position was saved and then the rotation stage 408 would rotate the UUT 402 to the next clocking position automatically. This process was repeated until a total of N rotations were performed. After all data was collected the local slopes at every clocking position were determined, and full aperture local slope maps in the x- and y-directions were calculated using the method described previously. These local slope maps were integrated using Southwell integration and the final reconstructed surface map was acquired.

Example 1—Fast Convex Mirror Measurements: To verify the performance of the system, a fast f/1.26 50 mm diameter convex sphere was measured using the above example system. The convex sphere is shown in FIGS. 4(b) and 4(c). Tests using 6, 45, 90, and 180 clocking positions were performed for comparison, which are referred to as IDR in the results described further below, where R is the number of clocking positions used, and defines the number of virtual screens which enclosed the UUT. The clocking positions were equally spaced over a full 360° to ensure maximum exposure of the UUT surface to the virtual displays. This was used to determine the as-built reconstruction performance as a function of clocking steps used.

The test using a total of 180 clocking positions, whose reconstructed surface map is referred to as ID180, served as the pseudo-ideal case representing the sufficient number of clocking steps. As an independent reference, the optic was measured using a Zygo Verifire™ MST interferometer which provided a comparison sag map, as illustrated in FIG. 4(b). Due to the available reference sphere and the as-manufactured shape of the UUT, the best null configuration tested only a 45.29 mm in diameter aperture inside of the 50 mm full diameter of the optic. This measured area is referred to as INT. In all final comparisons, the surface root-mean-square (RMS) data is calculated only in the common 45.29 mm inner circle of the reconstructed sag maps. FIG. 4(c) illustrates the convex sphere measured using the disclosed infinite deflectometry system.

Example 2: Alvarez Lens Measurements: An Alvarez lens was designed and manufactured from a PMMA 1-inch diameter disk, with the optical surface machined using a diamond turning machine to generate a 6 mm central aperture area inside of the PMMA disk. The ideal optical surface was generated to have 17 μm of Zernike term Z8, which represents horizontal coma, and −17 μm of Zernike term Z10, which represents 45° trefoil. This optic represents one half of an Alvarez lens pair. Due to the non-trivial freeform nature and wide dynamic range in the surface slopes, the full aperture had previously proven very difficult to measure. For example, without a custom nulling component, such as a CGH, the fringe density exceeded the measurable range of a commercial interferometer. The ID system was utilized to measure the full 6 mm central aperture, and the surface was reconstructed, referred to as IDAlvarez.

As an alternative reference comparison measurement, a contact-type KLA-Tencor Alpha-Step D-500 profilometer was utilized to measure a surface profile of the Alvarez lens. The profile line was carefully chosen to measure a profile which passed through the middle of the lens and featured primarily the coma terms. A contact force of 10 mg was utilized for the measurement in order to prevent any damage or scratch on the PMMA surface (a trial test was performed with a higher force on a separate PMMA disk and resulted in a scratch on the surface). The height range of the profilometer was limited to a maximum height deviation of 100 μm with the 10 mg force limit. It is for this reason that the profile, which measured the middle of the lens in the horizontal direction was chosen, as this profile would ideally feature heights within the measurement range while also highlighting the part of the unique surface shape of the Alvarez lens. The same profile was taken from the IDAlvarez reconstructed map and compared. For both profiles, the mean values of the measurements were subtracted from the raw data, thereby setting the mean for both data sets to zero for direct comparison.

Example Results and Comparisons: As note earlier, the disclosed infinite deflectometry methods utilize the clocking of the UUT to create a virtual 2π-steradian tipi-shaped source area which enclose the UUT. A deflectometry test is performed at each clocking position, and the local slopes at each clocking are calculated and then stitched together to create a full aperture local slope map of the UUT, which are integrated to generate the total sag map.

f/1.26 50 mm diameter convex sphere: For the comparison analysis, piston, tip/tilt, and defocus, corresponding to standard Zernike terms 1:4, were removed from both the interferometric and infinite deflectometry (ID) measurements, as they are blind to those terms. Additionally, more detailed comparisons were made after standard Zernike terms 1:6 were removed, after terms 1:21 were removed, and after terms 1:37 were removed. These are referred to for the IDR maps as $ID_R^{1:Z}$ and for the INT map as $INT^{1:Z}$, where Z refers to the highest number of standard Zernike terms removed. Finally, the surface sag root-mean-square (RMS) was calculated for the $ID_{180}^{1:Z}$, and $INT^{1:Z}$ maps over the common 45.29 mm circular aperture area of the UUT.

Figure 5:
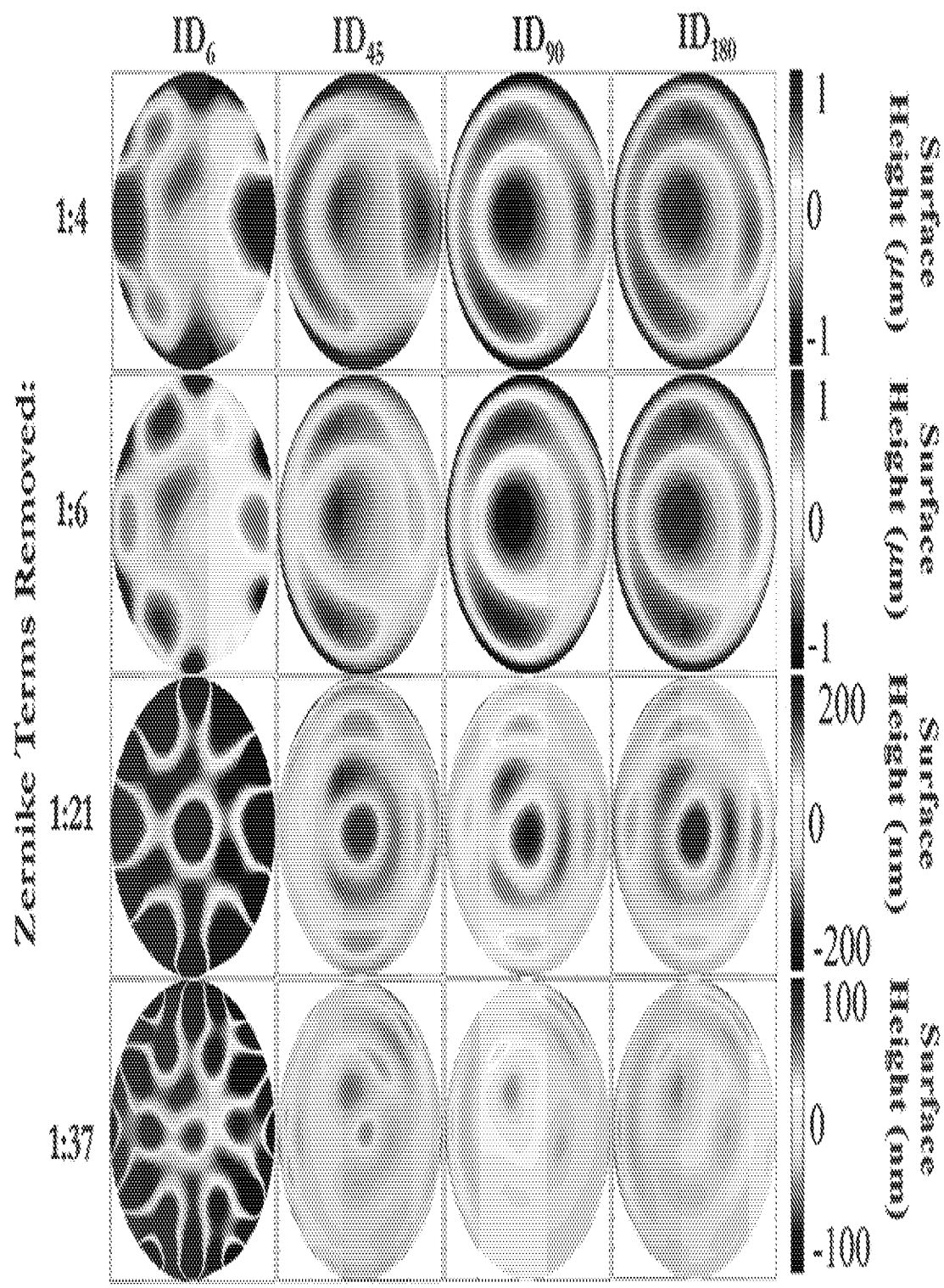
FIG. 5 illustrates comparisons of reconstructed surface maps for an optical component based on the number of rotation steps and removed Zernike terms in accordance with the disclosed embodiments.

The reconstructed surface maps $ID_R^{1:Z}$, with Z standard Zernike terms removed and R clocking positions utilized are presented in FIG. 5. The process was performed for a fast f/1.26 convex sphere for 6 (1$^{st}$ column), 45 (2$^{nd}$ column), 90 (3$^{rd}$ column), and 180 (4$^{th}$ column) clocking step positions, equally spaced over a full 2π rotation. Stitching errors are apparent for fewer clocking positions, and manifest clearly as Zernike terms 1:4 (1$^{st}$ row), 1:6 (2$^{nd}$ row), 1:21 (3$^{rd}$ row), and 1:37 (4$^{th}$ row) are removed from the surface map.

As further clocking steps are utilized in the ID system, improved reconstruction accuracy is achieved. Particularly of note are the high spatial frequencies in the reconstructed sag maps. The stitching error is most clear at high spatial frequencies when few clocking steps were used, such as in $ID_6^{1:37}$ and $ID_{45}^{1:37}$. It must be noted that for the as-built hardware used in the example ID system presented here, the full test of the optic to gather the measurement data using 180 clocking is ~2 hours and 35 minutes. This does not include processing time. Thus, there is a clear tradeoff between reconstruction accuracy and time of acquisition.

Figure 6:
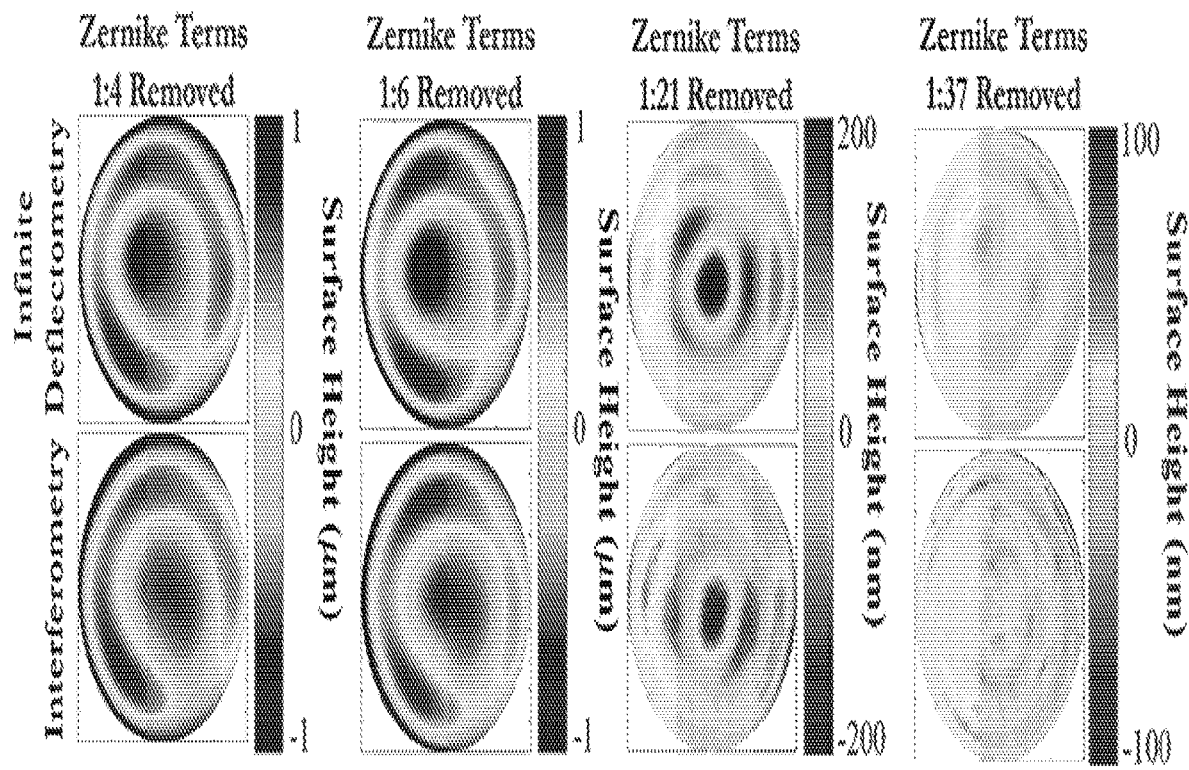
FIG. 6 illustrates comparisons of reconstructed surface maps for an optical component obtained using a commercially available interferometer and using a deflectometry system in accordance with an example embodiment.

The reconstructed surface maps generated by the ID metrology with 180 clocking steps, $ID_{190}$ and the Zygo Verifire™ MST interferometer, TNT, are compared in FIG. 6 as a function of Z standard Zernike terms removed. Due to uncertainties in both systems for the UUT piston, tip/tilt, and defocus, Zernike terms 1:4 were removed for both reconstruction maps (1$^{st}$ column). Additionally, to better compare the surface reconstruction across spatial frequencies, Zernike terms 1:6 ($2^{nd}$ column), 1:21 ($3^{rd}$ column), and 1:37 ($4^{th}$ column) were removed for both reconstruction maps.

The surface sag RMS values of the reconstructed maps $ID_{190}{}^{1:Z}$ and $INT^{1:Z}$, with Z standard Zernike terms removed, are calculated and reported in the table in FIG. 7. The values were only calculated over the common 45.29 mm diameter central aperture, to match the 45.29 mm diameter aperture measured by the interferometer. The $ID_{180}{}^{1:Z}$ and $INT^{1:Z}$ maps show close agreement across spatial frequencies. Additionally, the RMS surface sage values were very similar. However, due to the overlapping areas tested and the slope stitching, it appears that the ID process performs a slight smoothing process in the reconstructed map. Additionally, some error inherent in phase-shifting deflectometry systems may be negatively impacting the reconstruction accuracy in the infinite deflectometry test. These errors, including positioning uncertainty, have been well explored for PSD based deflectometry measurements. Finally, the ID process was readily able to achieve a full aperture reconstruction of the highly convex f/1.26 50 mm diameter optic, demonstrating increased testing capabilities for deflectometry.

It should be noted that the clocking or rotations can occur at discrete steps, as described, or, in some embodiments, can occur in a continuous manner. Additionally, the number of steps in the above configuration can vary depending on factors, such as the desired accuracy of measurements (e.g., larger number of steps results in a higher degree of overlap between capture or illumination fields, and thus improves the measurement accuracy), hardware and software capture capabilities (e.g., larger number of steps results in acquisition of more data, which may pose computational limitations), and/or the speed of measurements (e.g., fewer number of steps generally produces faster measurements), as, for example illustrated in FIG. 5, illustrating a reduction in measurement errors as the number of clocking steps is increased from 6 to 45 to 90 and to 180 steps. The speed of measurement is limited by how fast the UUT can be moved (e.g., rotated), as well as by the speed of capture electronics in the camera.

Figure 8:
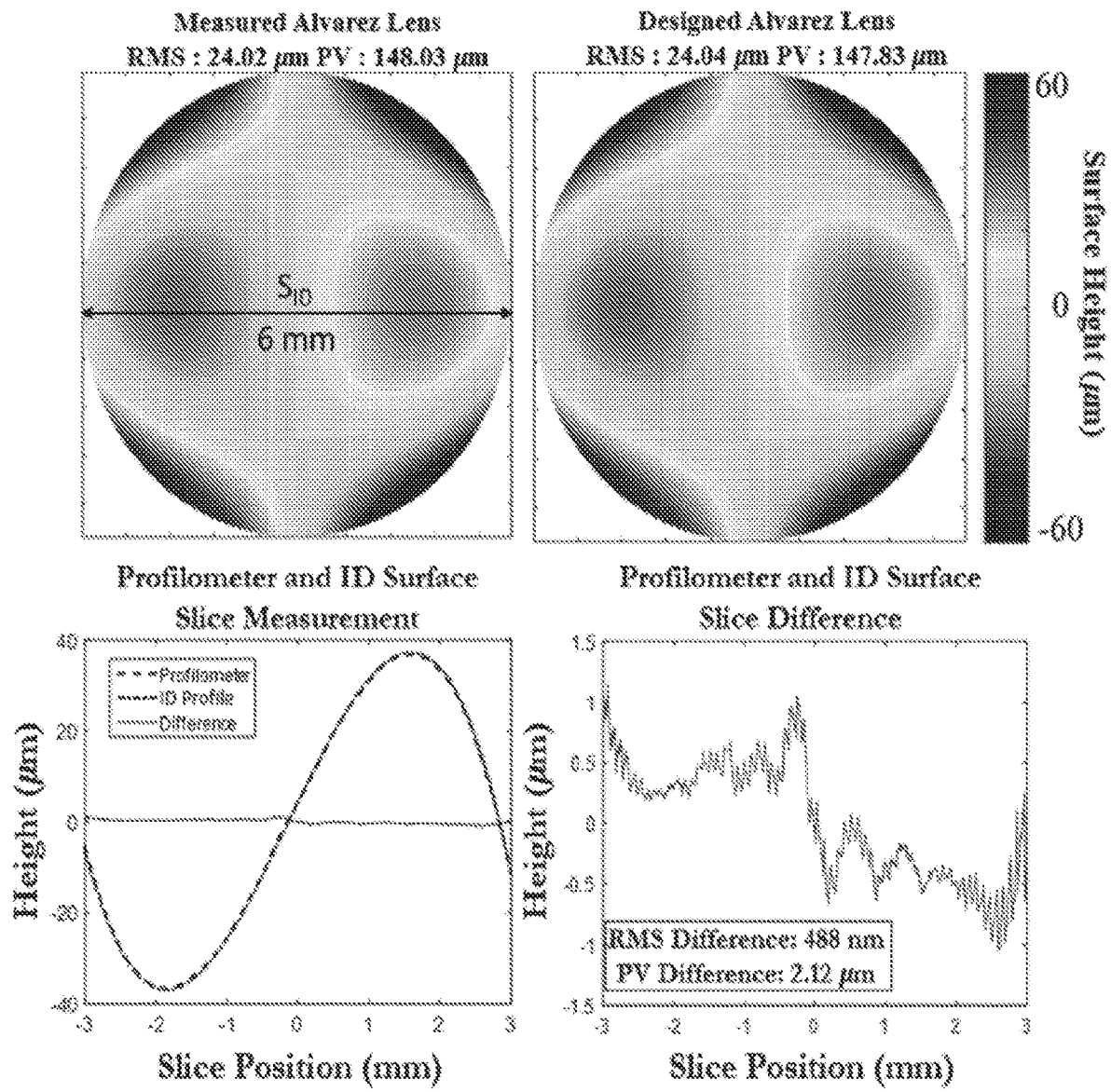
FIG. 8 illustrates comparisons of a reconstructed map for an example Alvarez lens obtained using a commercially available interferometer and using a deflectometry system in accordance with an example embodiment.
Figure 9:
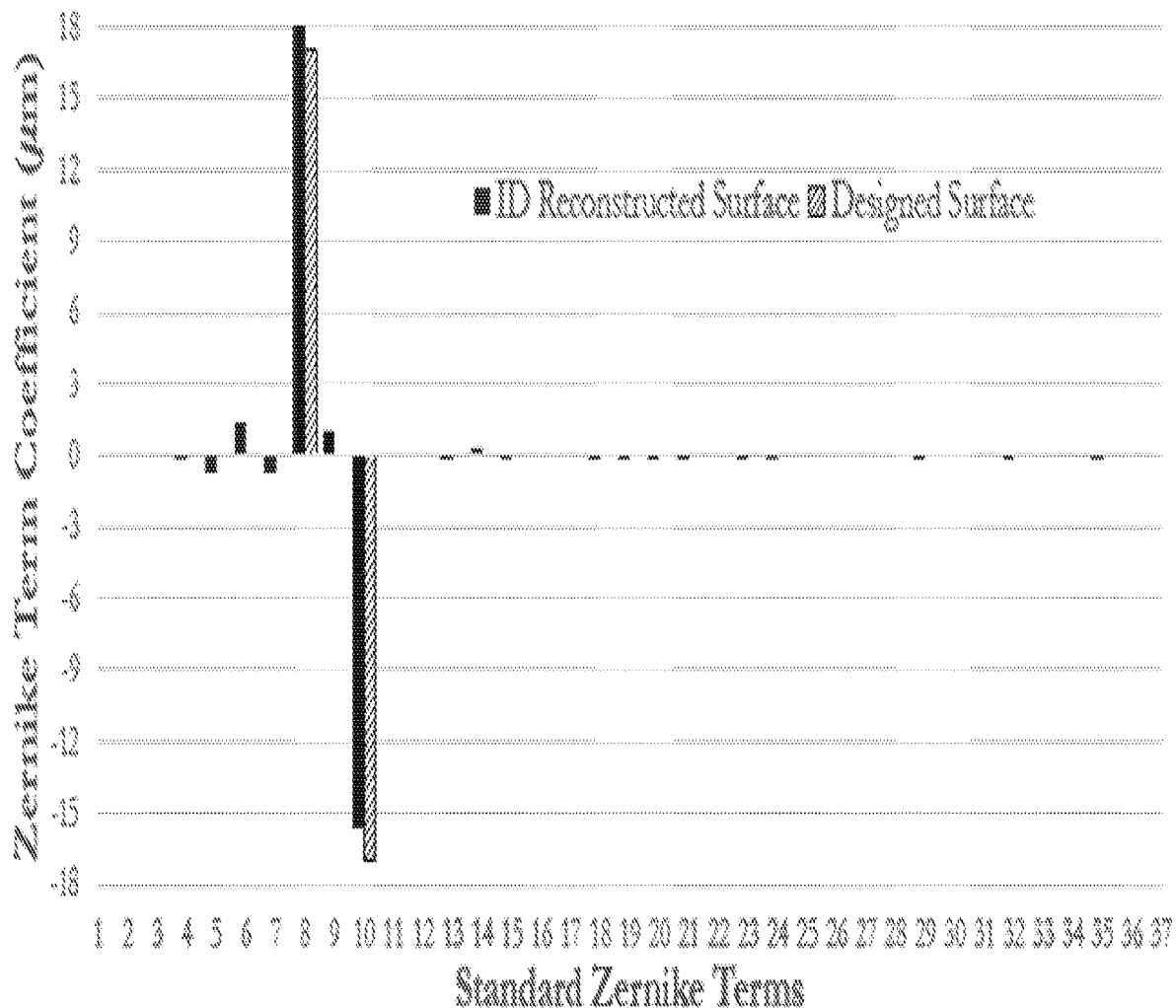
FIG. 9 illustrates comparisons of an ideal (design) map fitted with Zernike terms and a fitted surface map obtained using a deflectometry system in accordance with an example embodiment.

Alvarez lens results: The reconstructed map of the 6 mm optical area of the Alvarez lens as measured by the disclosed infinite deflectometry (ID) system, IDAlvarez, and a comparison theoretical (i.e., designed) surface map are given in FIG. 8. Additionally, the height profile as measured by the KLA-Tencor Alpha-Step D-500 profilometer, SP, and the height of the same profile taken from the IDAlvarez map, SID, are produced. As noted earlier, the Alvarez lens represents a highly freeform surface which presents a unique metrology problem. Using a diamond turning machine a 6 mm diameter Alvarez lens with 17 μm of horizontal coma and −17 μm of trefoil was designed (top right in FIG. 8) and manufactured. The final surface generated was measured using the Infinite Deflectometry system with 180 clocking positions (top left in FIG. 8) To cross-check the measured data performance, a KLA Alpha-Step D-500 profilometer was used to measure a profile of the optic. The surface height of the profile from the ID measurement, and the profilometer were compared (bottom left in FIG. 8) and the difference was calculated (bottom right in FIG. 8). Standard Zernike terms 1:37 were fit to the IDAlvarez map, and the designed term values (i.e., ideal surface) are compared in FIG. 9. In FIG. 9, the black bars represent the infinite deflectometry surface map that was fitted with standard Zernike terms 1:37 and the Zernike terms representing the design values are represented by cross-hatched bars. The RMS surface deviation from ideal design was 2.75 μm with Zernike terms 1:4 removed, 1.78 μm with terms 1:8 removed, 178 nm with terms 1:21 removed, and 160 nm with terms 1:37 remove.

The disclosed system was able to achieve a full aperture surface reconstruction of the Alvarez lens, a 6 mm diameter freeform generated in a PMMA disk. The surface had ~148 μm PV of surface height variation over it. The reconstructed map was similar to the ideal surface, however, the measurement reported small amounts of Zernike terms Z5, Z6, and Z9, which represent vertical and 45-degree astigmatism and vertical trefoil respectively. Additionally, the magnitude of Z8 and Z10 in the reconstructed surface did not exactly match the designed surface. This is not unexpected for the manufacturing tolerance of machining performed for the surface. For an independent verification, a profilometer measurement of a profile of the surface was in close agreement to the same slight from the reconstructed ID surface, with 488 nm RMS difference.

It should be noted that to carry out the disclosed deflectometry operations, the minimum number of steps depends on the size of the screen (light source), the field of view of the camera, and the geometry (e.g., size and radius of curvature) of the UUT. In order to obtain a 2π-steradian measurement range, the number of steps must be selected to produce a virtual light field that fully encloses the UUT. By the way of example, and not by limitation, FIG. 2(b) illustrates an example virtual screen enclosure obtained via 6 rotations of the UUT. Because each screen can only cover a segment of the UUT, a reverse ray trace from the camera pinhole to the UUT is performed to determine the intercept locations with the virtual screens, seen from the top down as scattered points. As evident from, for example, FIG. 2(b), the virtual light enclosures produced in each rotation overlap with one another.

While for illustration purposes, the example configurations described, such as the configuration in FIG. 2(a), show a simple ration of the UUT, in some embodiments, the UUT may be moved rotationally, translationally, or generally in an arbitrary direction in a three-dimensional space (e.g. in X, Y, and Z directions in a cartesian coordinate System, or in r, θ, and φ in a spherical coordinate system) using an XYZ translation stage, or other suitable movable stages or devices. In some embodiments, a full sphere (i.e., 4π-steradian) measurement range can be obtained by, for example, conducting measurement over a 2π-steradian range as disclosed herein, flipping the UUT with respect to a plane (e.g., horizontal plane), and repeating the measurements over another 2π-steradian range.

In some embodiments, the light source (sometimes referred to as the screen) comprises a plurality of light sources (e.g., LED's) that are arranged in a continuous row-column format for illuminating the object under test. In such displays, the pixels (i.e., individual light sources) are arranged in alignment with pixels in adjacent rows and columns, and thus provide a suitable light source array for deflectometry measurements. In some embodiments, the light source includes a white light source with wideband spectral characteristics. In some embodiments, the spectral contents of the light source can be selected in accordance with characteristics of the UUT or mode of operation (e.g., reflection vs. transmission). For example, in configurations that conduct measurements in reflection (such as the one illustrated in FIG. 2(a)), the spectral contents of the light source can be selected to ensure that sufficient light is reflected from the UUT. In configurations that conduct measurements in transmission (e.g., the camera and the screen in FIG. 2(a) are positioned at opposite sides of the UUT), the light source can be selected to ensure that sufficient light is transmitted through the UUT. Additionally, in some embodiments, the spectral contents of the light source can be selected in accordance with surface roughness characteristics of the UUT. For example, for UUTs having a rough surface profile, light with longer wavelengths (e.g., in infrared range) can be used. In particular, for surfaces with a root-mean-square (RMS) micro roughness values from ~1 µm to ~50 µm, a measurement wavelength in the range of ~10 µm can be utilized. For surfaces with an RMS micro roughness less than 1 µm, visible wavelengths can be used.

Figure 10:
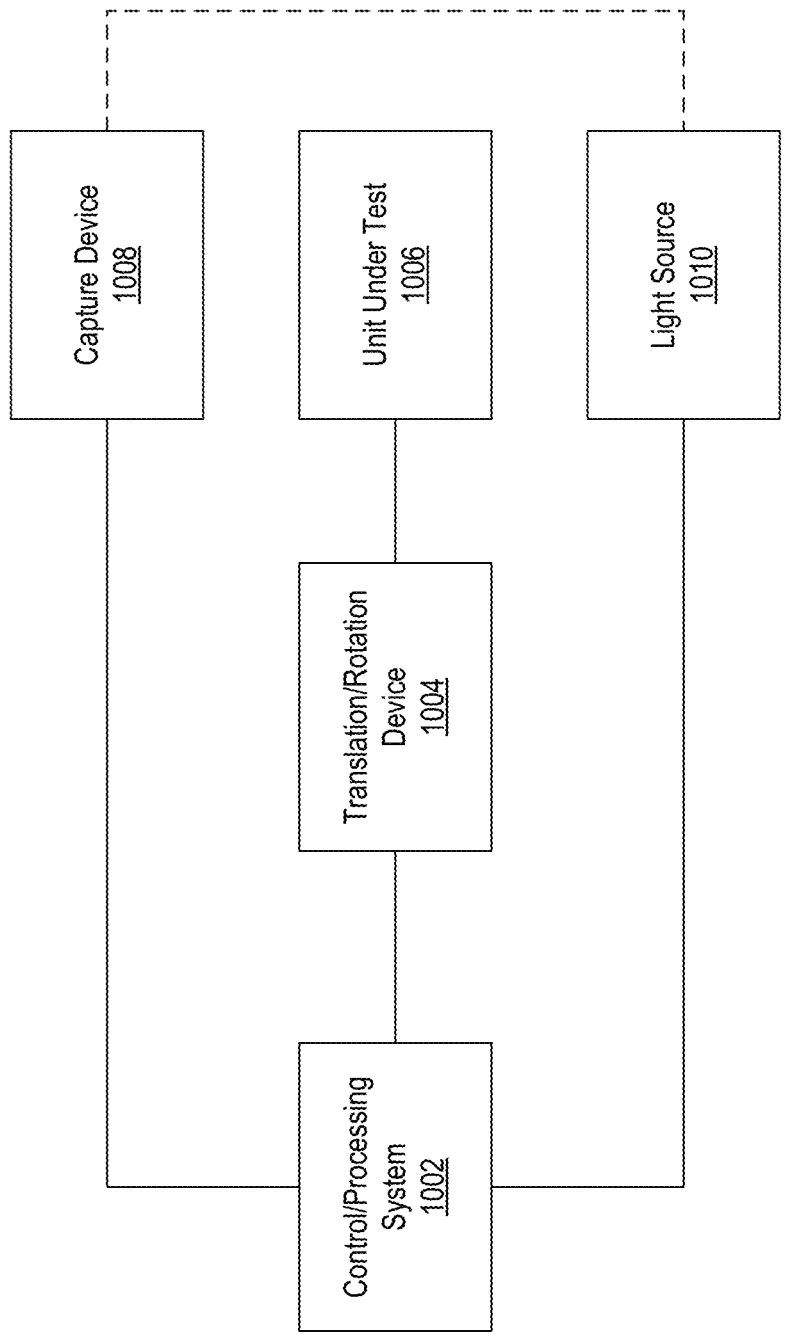
FIG. 10 illustrates a block diagram of various components in a deflectometry system in accordance with some example embodiments.

FIG. 10 illustrates a block diagram of various components in a deflectometry system in accordance with some example embodiments. In particular, a control/processing system 1002 is configured to communicate with a translation/rotation device 1004, a capture device 1008 and a light source 1010. The translation/rotation device 1004 is coupled to the unit under test 1006, a component having an arbitrary shape, such as a flat, a convex or a freeform optical component. In some embodiments, the unit under test 1006 is an Alvarez lens. The control/processing system 1002 can include a processor and memory including processor executable code, as well as suitable input/output (IO) capabilities (e.g., wired or wireless) to transmit and receive commands and/or data with to and from the translation/rotation device 1004, the capture device 1008, and the light source 1010. In some embodiments, the light source 1010 and the capture device 1008 may also be in communication with each other to, for example, synchronize illumination and capture operations. The light source may be flat or a non-flat light source array that is positioned to illuminate the unit under test 1006. The capture device 1008 may be a camera that includes a CCD, a CMOS or another device light sensing technology. In some embodiments, the capture device 1008 is positioned to receive the light after reflection from the unit under test 1006. In some embodiments, the capture device 1008 is positioned to receive light that has transmitted through the unit under test 1006. The measurement data is transmitted by the capture device 1008 to the control/processing system 1002, where the data is processed (e.g., stitched together) and further processed to produce surface and/or depth measurement information regarding the unit under test 1006. The data processing operation, in some embodiments, can include filtering and other data processing operations to improve signal-to-noise ratio, determination of local slopes associated with optical rays reflected from, or transmitted through, the unit under test 1006, mapping from one coordinate system to another coordinate system, and other operations that are disclosed herein.

Figure 11:
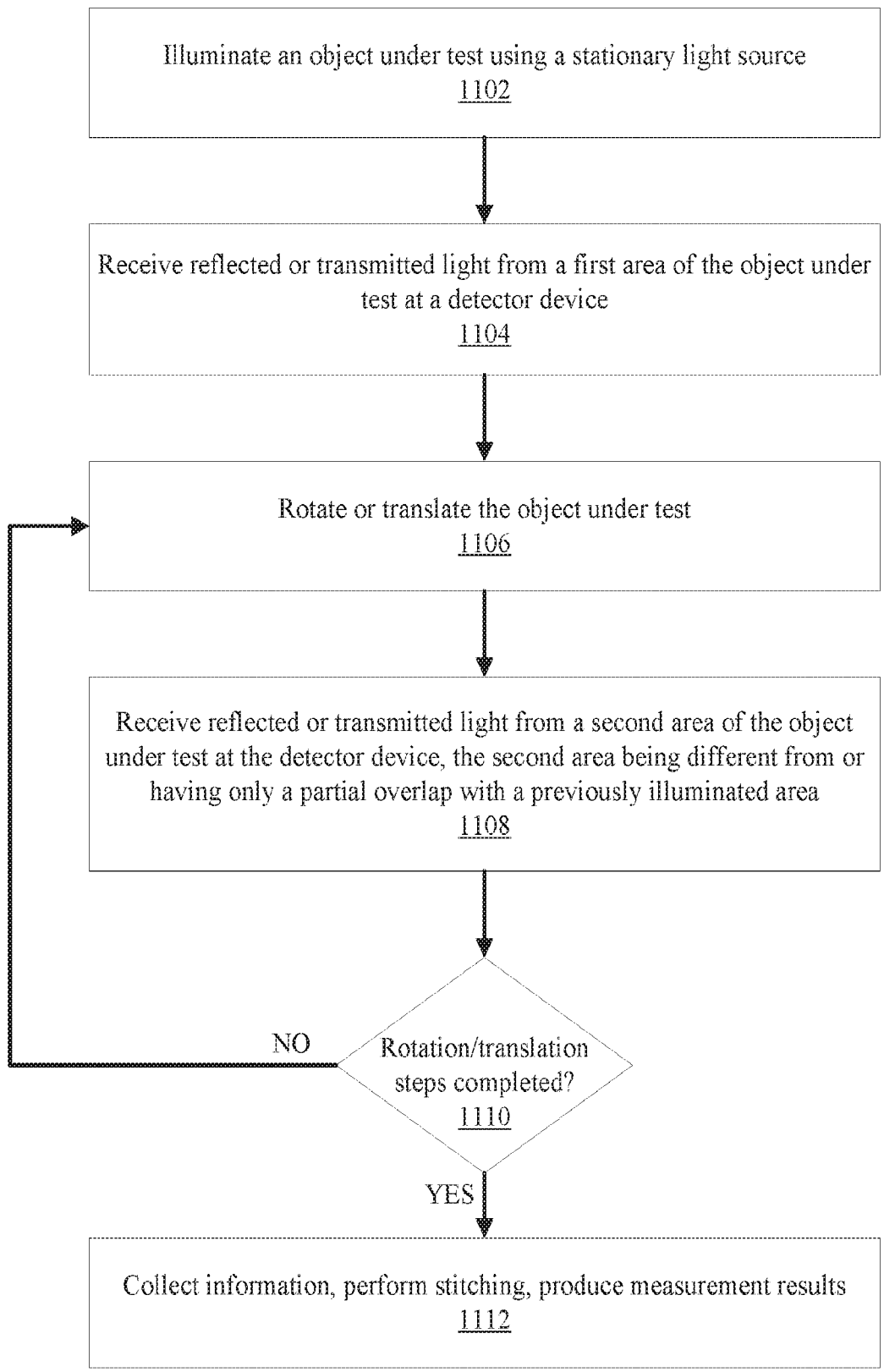
FIG. 11 illustrates a set of operations that can be carried out to operate a deflectometry system in accordance with an example embodiment.

FIG. 11 illustrates a set of operations that can be carried out to operate a deflectometry device in accordance with an example embodiment. At 1102, a stationary light source is used to illuminate an object under test. At 1104, reflected or transmitted light is received from a first area of the object under test at a detector device. At 1106, the object under test is rotated or translated. At 1108, reflected or transmitted light is received from a second area of the object under test at the detector device, where the second area is different from or has only a partial overlap with a previously illuminated area. At 1110, it is determined whether the number of rotation or translation steps are completed. If the steps are completed (YES), the operations move to 1112, where the information from the detector device is collected, stitching of images is performed, and deflectometry measurement results are produced. If the steps have not been completed (NO at 1110), the operations return to 1106 to repeat the process. It should be noted that while the above operations describe step-wise rotation and/or translation of the object under test, in some embodiments, the object may be rotated/translated in a continuous fashion.

As described earlier, one example set of operations to produce a full aperture reconstructed surface map of the object under test is illustrated in FIG. 3. For example, in some embodiments, performing the measurement includes stitching the collected information together to form a virtual illumination space. In another example embodiment, performing the measurement also includes computing gradients associated with the reflected light from each of the areas. In another embodiment, performing the measurement further included determining a surface profile or a surface depth map of the object under test.

One aspect of the disclosed embodiments relates to a deflectometry system that includes a light source including a plurality of light emitting devices arranged in a sequence to illuminate an object under test with incident light, and a detector positioned to receive a reflected light produced upon reflection of the incident light from the object under test or a transmitted light produced upon transmission of the incident light through the object under test. The deflectometry system further includes a movable stage for holding or securing the object under test. The movable stage is configured to move in one or both of a translational or a rotational direction and to thereby cause the object under test to translate or rotate. The movable stage is also configured to move in a plurality of steps such that, for each of the plurality of steps, the reflected light or the transmitted light received at the detector encompasses a portion of a full illumination space surrounding the object under test, and the reflected light or the transmitted light received at the detector from all of the plurality of steps encompasses the full illumination space that contiguously surrounds the object under test.

In some embodiments, the full illumination space comprises $2\pi$ steradians. In one example embodiment, the reflected or the transmitted light received at the detector associated with each step produces the portion of the full illumination space that has an overlap with another portion of the full illumination step associated with at least one other step. In another example embodiment, the deflectometry system includes a control system comprising a processor and memory including instructions stored thereon to receive or transmit commands or information to one or more of: the detector, the light source or the movable stage. In yet another example embodiment, the instructions when executed by the processor cause the processor to receive information from the detector corresponding to the reflected or the transmitted light received at the detector for each step, and to further process the received information associated with each step.

According to another example embodiment, the instructions when executed by the processor cause the processor to transmit information to the movable stage indicative of a particular amount of rotational or translation movement associated with at least one of the plurality of steps. In another example embodiment, the deflectometry system is configured to operate with the object under test having a convex surface or flat surface. In yet another example embodiment, the deflectometry system is configured to operate with the object under test having an arbitrary shape. In still another example embodiment, the deflectometry system is configured to operate with a freeform optical component.

In one example embodiment, the moveable stage is configured to allow the object under test to be flipped around a plane to produce the full illumination space of up to $4\pi$ steradians. In another example embodiment, the light source is a flat screen comprising a plurality of light producing elements arranged in a row-column configuration. In still another example embodiment, the light source is operable at one or more wavelengths or ranges of wavelengths. In another example embodiment, the operable light source wavelength is selectable in correspondence with properties of the object under test. In yet another example embodiment, the light source is operable in an infrared range of wavelengths.

In another example embodiment, the movable stage is configured to move in a continuous manner. According to one example embodiment, the reflected or transmitted light received by the detector forms a virtual illumination space providing illumination to the unit under test without requiring movement of the light source or the detector.

Another aspect of the disclosed embodiments relate to a deflectometry device that includes a plurality of stationary light sources configured to illuminate an object under test having a flat or a convex surface, a stationary camera positioned to receive reflected light from a first area of the object under test, and a movable stage configured to rotate or translate the object under test in a plurality of discrete or continuous steps such that, after movement in each step, the camera at its original stationary position is configured to receive light reflected from an area of the object under test that is different from, or only partially overlaps with, the first area of the object under test.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A deflectometry system, comprising:
   a light source including a plurality of light emitting devices arranged in a sequence to illuminate an object under test with incident light, wherein the object under test has a convex surface;
   a detector positioned to receive a reflected light produced upon reflection of the incident light from the object under test or a transmitted light produced upon transmission of the incident light through the object under test; and
   a movable stage for holding or securing the object under test, the movable stage configured to move in one or both of a translational or a rotational direction and to thereby cause the object under test to translate or rotate;
   wherein the movable stage is configured to move in a plurality of steps such that, for each of the plurality of steps, the reflected light or the transmitted light received at the detector encompasses a portion of a full illumination space surrounding the object under test, wherein the detector's field of view is smaller than a full illumination space that contiguously surrounds the object under test, and the reflected light or the transmitted light received at the detector from all of the plurality of steps encompasses the full illumination space that contiguously surrounds the object under test.

2. The deflectometry system of claim 1, wherein the full illumination space comprises 2π steradians.

3. The deflectometry system of claim 1, wherein the reflected or the transmitted light received at the detector associated with each step produces the portion of the full illumination space that has an overlap with another portion of the full illumination space associated with at least one other step.

4. The deflectometry system of claim 1, comprising a control system including a processor and memory including instructions stored thereon to receive or transmit commands or information to one or more of: the detector, the light source or the movable stage.

5. The deflectometry system of claim 4, wherein the instructions when executed by the processor cause the processor to receive information from the detector corresponding to the reflected or the transmitted light received at the detector for each step, and to further process the received information associated with each step.

6. The deflectometry system of claim 4, wherein the instructions when executed by the processor cause the processor to transmit information to the movable stage indicative of a particular amount of rotational or translation movement associated with at least one of the plurality of steps.

7. The deflectometry system of claim 1, configured to operate with the object under test having an arbitrary shape.

8. The deflectometry system of claim 1, configured to operate with a freeform optical component.

9. The deflectometry system of claim 1, wherein the moveable stage is configured to allow the object under test to be flipped around a plane to produce the full illumination space of up to $4\pi$ steradians.

10. The deflectometry system of claim 1, wherein the light source is a flat screen comprising a plurality of light producing elements arranged in a row-column configuration.

11. The deflectometry system of claim 1, wherein the light source is operable at one or more wavelengths or ranges of wavelengths.

12. The deflectometry system of claim 11, wherein the operable light source wavelength is selectable in correspondence with properties of the object under test.

13. The deflectometry system of claim 11, wherein the light source is operable in an infrared range of wavelengths.

14. The deflectometry system of claim 1, wherein the movable stage is configured to move in a continuous manner.

15. The deflectometry system of claim 1, wherein the reflected or transmitted light received by the detector forms a virtual illumination space providing illumination to the unit under test without requiring movement of the light source or the detector.

16. A deflectometry device, comprising:
a plurality of stationary light sources configured to illuminate an object under test having a convex surface;
a stationary camera positioned to receive reflected light from a first area of the object under test; and
a movable stage configured to rotate or translate the object under test in a plurality of discrete or continuous steps such that, after movement in each step, the camera at its original stationary position is configured to receive light reflected from an area of the object under test that is different from, or only partially overlaps with, the first area of the object under test, wherein the stationary camera's field of view is smaller than a full illumination space that contiguously surrounds the object under test, and the reflected light received at the stationary camera from all of the plurality of steps encompasses the full illumination space that contiguously surrounds the object under test, and wherein the full illumination space comprises $2\pi$ steradians.

* * * * *